June 16, 1931.  H. E. ANDERSON  1,810,116
RAILWAY CAR HAND BRAKE
Filed March 22, 1928  2 Sheets-Sheet 1

INVENTOR.
H. E. Anderson
BY
Thorpe & Thorpe ATTORNEYS.

June 16, 1931.  H. E. ANDERSON  1,810,116
RAILWAY CAR HAND BRAKE
Filed March 22, 1928  2 Sheets-Sheet 2
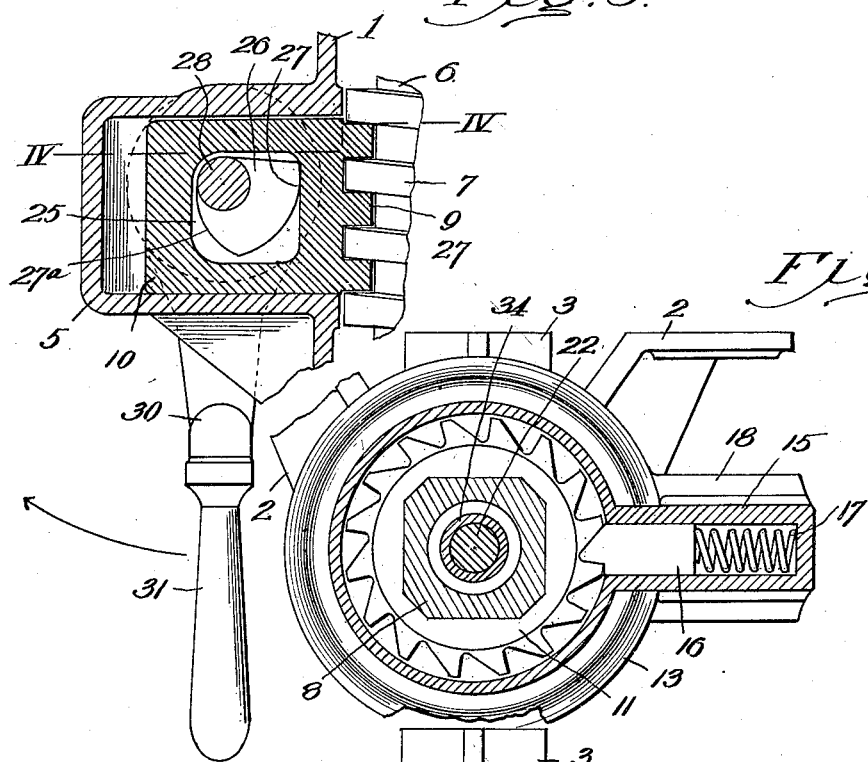
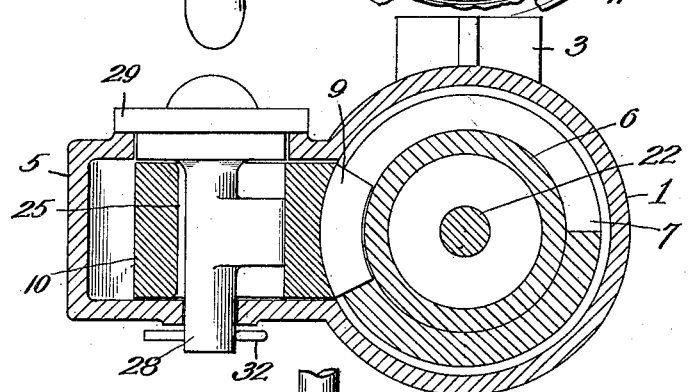
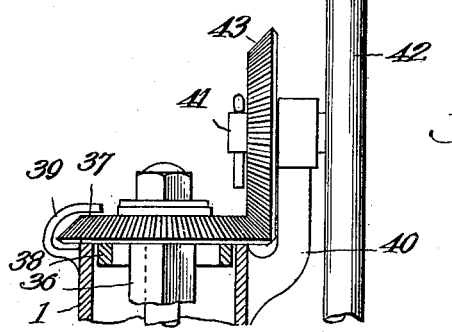
INVENTOR.
H. E. Anderson,
BY
ATTORNEYS.

Patented June 16, 1931

1,810,116

UNITED STATES PATENT OFFICE

HARLEY E. ANDERSON, OF KANSAS CITY, MISSOURI, ASSIGNOR TO GUSTIN-BACON MANUFACTURING COMPANY, OF KANSAS CITY, MISSOURI, A CORPORATION OF MISSOURI

RAILWAY CAR HAND BRAKE

Application filed March 22, 1928. Serial No. 263,710.

This invention relates to railway car hand brakes and has for its object to produce braking apparatus which will completely and efficiently comply with the American Railroad Association rules which require power increasing apparatus whereby the average trainman can readily apply to the brakes, without the use of a brake stick or accessory apparatus, power equal to that applied by the air brake cylinder.

Another object of the invention is to provide brake operating mechanism which entirely obviates the use of a brake chain at the lower end of the brake staff adjacent the corner of the car. This has proven a highly objectionable construction in that the brake staff when unwound allows the chain to sag, as the piston rod of the brake cylinder to which the brake rod is connected does not automatically recede to take up the slack. Upon the reapplication of the hand brakes, the chain will not properly wind on the brake staff or other drum and it is consequently impossible to develop the necessary braking force. With the device of the invention, however, when the brake is released, the horizontal brake rod is also pushed back to normal position providing the slack in the chain which customarily connects the end of the brake rod to the piston rod.

A further object of the invention is the provision of brake apparatus provided with a quick take-up for the removal of the slack in the brake rigging and the consequent quick application of power to the brake shoes, and in which the brake staff is lifted vertically rather than rotated. When a car end has been bulged out by shifting of its load a rotatable brake staff is practically always wedged so tightly that it is impossible to set the brakes, with a slidable staff however, it can never be wedged by the bulging of the car end.

A still further object is to provide a brake involving the use of a screw or worm having immediate release mechanism, whereby upon the tripping of a lever the entire mechanism assumes brake-off position, this mechanism also being of such nature that no parts shall project above the car when the brakes are on which is of importance on open top cars.

A still further object of the invention is to provide a brake of the worm type which has no back-lash and it is consequently possible for the operator to hold all of the power he places on the brake shoes; the construction, by a slight modification, also providing means whereby the brake shoes may be partly released for controlling the coasting of a car and can be immediately set at any desired position without danger of fouling.

With the general objects named in view, and others as will hereinafter appear, the invention consists in certain novel and useful features of construction and organization of parts as hereinafter described and claimed; and in order that it may be fully understood, reference is to be had to the accompanying drawings, in which:

Figure 3 is a section on the line III—III of Figure 1.

Figure 4 is a section on the line IV—IV of Figure 3.

Figure 5 is a section on the line V—V of Figure 2.

Figure 6 is a reduced side elevation of the upper end of the brake apparatus as modified to secure a gradual release of the brakes.

Figure 1:
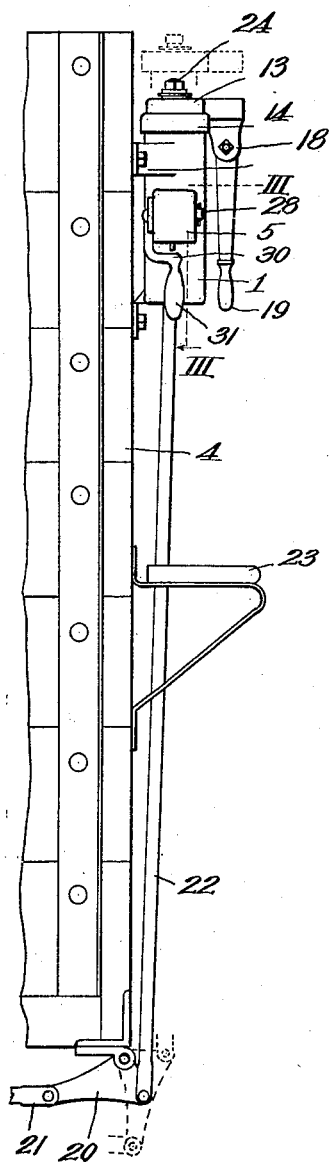
Figure 1 is a side elevation of the end of an open top car equipped with brake apparatus embodying the invention.

In the drawings, 1 indicates a cylindrical casing open at its ends, said casing being formed integrally with a pair of projecting ears 2 adjacent its upper end and with a downwardly projecting ear 3 at its lower end, for attachment to the end of a railway car 4. It is to be understood that casing 1 may be attached at any desired point on the car, and in use with open top cars will be preferably secured at such a point that the vertically moving parts (hereinafter referred to) shall not project beyond the upper edge of the car. Integrally formed with and projecting from one side wall of casing 1, intermediate its length, is a boxing 5.

The casing 1 provides a container for a hollow screw, or worm member 6, having lefthand threads 7 and at its upper end terminates in a rectangular head 8 projecting beyond the open end of the casing 1. In engagement with the screw 6 are the threads 9 of a half nut 10 slidingly mounted within the boxing 5. As the casing 1 and consequently the nut 10 are fixed against vertical movement, it will be evident upon imparting clock-wise rotation to the screw 7 through application of force on its rectangular head 8, that the screw will travel upwardly and will project beyond the upper end of casing 1.

In order to provide manually operable means to effect elevation of the screw, the rectangular head 8 is fitted within a corresponding opening in a ratchet gear 11, resting upon the shoulder 12 formed on the worm 7. Fitting loosely on the ratchet gear 11 is a cap 13 having a downwardly extending flange 14 to seal the apparatus against the weather. The cap 13 is formed integrally with an offset casing 15 providing a socket for the reception of a dog 16 held enmeshed with the ratchet teeth of the gear 11 by means of an expansion spring 17. The casing 15 is provided with a pair of downwardly extending ears 18 between which is pivotally mounted a brake applying lever 19.

Pivotally secured to the corner sill of the car is a bell-crank lever 20, to the opposite ends of which are pivotally secured the horizontal brake rod 21 (connected at its opposite end to the customary short length of chain which is secured to the piston rod) and the vertical brake staff 22. The brake staff 22 normally occupies a position inclined slightly from the vertical as shown in Figure 1, and extends upward through a slotted opening (not shown) in the brake step 23 and passes through the hollow worm 7. It will be evident that as the brake staff 22 is pulled upwardly its lower end will swing in an arc toward the vertical and that it will then incline in the opposite direction until it again approaches its original angle of inclination at which time the mechanism will have reached its limit of travel, the opening in the bottom of casing 1 being sufficiently large to accommodate this movement.

Figure 2:
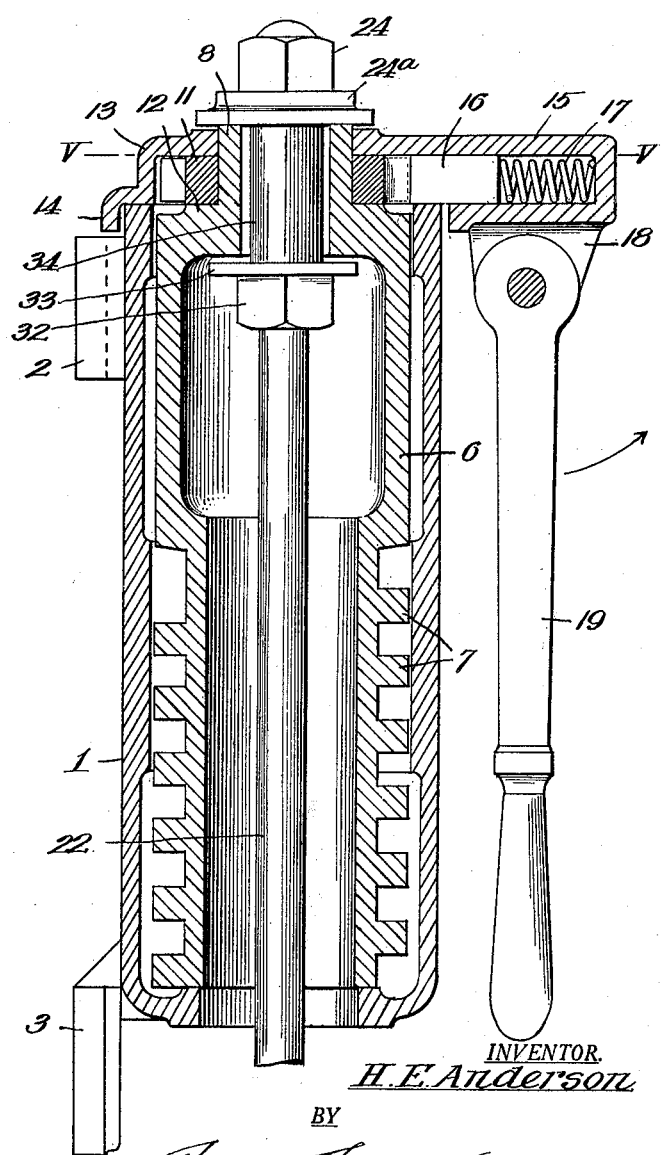
Figure 2 is an enlarged central vertical section through brake operating means.

To effect a vertical lift of the brake staff 22 as the screw is turned through the operator throwing the handle 19 to a horizontal position as indicated by the arrow, Figure 2, the upper end of said staff is threaded for engagement with a nut 24 and underlying bearing or load carrying washer 24ª resting on the end of the worm 7, which projects beyond the cap 13 so that said cap shall be freely revolvable. Considering that the screw has been operated to effect action of the brakes as above described, it being here noted that the bell-crank lever is so proportioned that its greatest throw is at the commencement of its movement to immediately take all of the slack out of the brake rigging, it will be evident that the construction will hold any braking force developed by the operator.

All worm wheel brake mechanism of the character shown in this case with which I am familiar have been objectionable as it was necessary to entirely reversely unscrew the worm to effect complete release of the brakes. In order therefore to obviate the slow and ineffectual method heretofore employed, the slidingly mounted half nut 10 is provided with a central opening 25, receiving an eccentric 26 provided with a pair of cam faces 27 and 27ª. Referring to Figure 3, it will be noted that the cam face 27 by contact above the center line maintains the nut enmeshed with the screw 7. The cam 26 is formed integrally with a shaft 28 journaled at its ends in the side walls of the boxing 5, one of said ends being enlarged as 29 to provide a bearing portion and extending down between the boxing and the car, see Figure 1, and having a horizontal portion 30 terminating in a vertically extending handle 31 in alignment with the center of the boxing as illustrated. This construction provides room for the hand of the operator. The free end of the shaft 28 is secured in position by a cotter pin 32. With this construction, it will be evident that the release handle 31 cannot be purposely or accidentally detached even though the cotter pin should be lost, as its end will abut against the car before the eccentric is entirely withdrawn from the opening in the half nut.

When it is desired to release the brakes, the operator throws the release handle in the direction of the arrow Figure 3, and the cam face 27ª strikes the rear wall of the nut and due to the great advantage in leverage slides the threads on the nut out of mesh with the worm threads 6. The weight of the worm 7 and connected parts is sufficient to immediately fall by gravity and effect reverse operation of the brake rod 21 to release the brakes. It is to be here noted that should the half nut fail to exactly mesh with the worm teeth when the brakes are in released position, the release lever 31 will stand at a slight angle. However, ordinarily vibration of the car will quickly effect a slight shifting of the parts until the threads on the nut and worm enter into engaged relation, and even if the parts do not go into mesh the weight of the pivoted handle maintains a constant pressure tending to force the threads on the nut into mesh with the worm threads. Consequently the first two or three turns of the worm will realine the threads for enmeshment under the torque applied by the release lever.

In order to insure the downward movement of the brake staff 22 and the consequent return of the brake rod 21 to normal position, the staff is threaded for engagement with a nut 32 holding a washer 33 in spaced position for engagement with the inner end of the shouldered portion 12 of the worm 7. The exact position of the nut 32 is regulated in one direction by the length of the threaded portion and in the opposite direction by a spacing sleeve 34 encircling the staff 22 and in abutment at its upper end with a load-carrying washer 24ª below the nut 24. With this construction it will be evident that washer 35 will effect the vertical travel of the brake staff 22 when the worm moves upwardly and that the washer 33 will insure return of the brake staff to normal position when the worm falls downwardly through the operation of the release lever.

With the above brake mechanism it is impossible to effect a gradual release of the brakes. A modified construction to accomplish this result is indicated in Figure 6, where the cap 13 has been omitted.

In this construction the upper end 36 of the worm 7 is rectangular for a distance equal to the maximum travel of the brake mechanism, and said end projects through a correspondingly shaped opening in a bevel gear 37 resting on the upper end of the casing 1 and having a centering flange 38 fitted within the end of the casing to maintain the gear in position, the casing 1 at one side being formed with a right angle shaped flange 39 embracing and overlying the periphery of the bevel gear to hold the same against vertical movement upon the upward movement of the worm as will hereinafter appear. The upper end of the casing 1 opposite the flange 39 is formed integrally with an upstanding offset bracket 40 in which is journaled a shaft 41 carrying at one end a hand wheel 42 and at its other end a bevel gear 43 enmeshed with the first-named gear. The other parts of the mechanism are identical with those hereinabove described, except of course the ratchet gear 11, dog operating mechanism 16, and the handle 19 are omitted. It will be apparent that upon proper operation of the hand wheel 42 rotation will be imparted to the worm 7 through the bevel gear 43 fitted on the rectangular end 36, and that said worm will travel upwardly. The center flange 38 will hold the bevel gear 37 in mesh with its companion gear 43 and the flange 39 will prevent the wedging or jambing as the worm and brake staff are elevated.

It will here be noted that the manual operating means does not travel upwardly with the worm as it does in connection with the construction above described. By reversely operating the hand wheel the operator may exert a graduated pressure on the brake shoes for the better control of the car, or he may trip the mechanism with the release handle 31 for the immediate and entire release of the brakes, downward movement of the worm not effecting reverse spinning of the hand wheel.

From the above description, it will be apparent that I have produced a construction embodying all of the features of advantage set forth as desirable and, while I have described and illustrated the preferred embodiments of the invention, it is to be understood that I reserve the right to make all changes properly falling within the spirit and scope of the appended claims.

I claim:

1. Brake operating mechanism comprising a support and a worm cooperating therewith, a support and worm being so mounted that said support and worm remains stationary and the other one member remains stationary and the other member is adapted for rotation and longitudinal travel, means for imparting rotation to the rotatable member to effect its longitudinal travel, means for tripping the moving member to permit it to slide to normal position, and means connected to the movable member and adapted to effect operation of the brakes.

2. Brake operating mechanism comprising a support a worm rotatively mounted with respect to said support, a non-rotatable split nut for effecting longitudinal movement of the worm upon the rotation of said worm, said nut being adapted for sliding movement transversely of the support, means for disengaging the nut from said worm, and means connected to the worm adapted to effect application of the brakes.

3. Brake operating mechanism comprising a support, a worm rotatively mounted with respect to said support, means for effecting rotation of said worm, a movable non-rotatable nut enmeshed with said worm and fixed to said support against movement parallel with the travel of the worm, manually operable means to effect disengagement of the worm and nut, and a brake staff connected to said worm and adapted to effect application of the brakes.

4. Brake operating mechanism comprising a support, a worm rotatively mounted with respect to said support, means for effecting rotation of said worm, a movable non-rotatable nut enmeshed with said worm and fixed to said support against movement parallel to the travel of the worm, a cam in contact to the nut to hold the same enmeshed with the worm, means for disengaging the worm and the nut, and a connection secured to the worm and adapted to effect operation of the brakes.

5. Brake operating mechanism comprising a support, a worm rotatively mounted with respect to said support, means for effecting rotation of said worm, a movable nut enmeshed with said worm fixed to said support against movement parallel to the travel of the worm, an eccentric mounted in the support and having a pair of cam faces, one cam face being adapted to maintain the nut enmeshed with the worm and the other cam face being adapted to move the nut out of engagement with the worm, a lever for operating said eccentric, and a connection secured to the worm and adapted to effect operation of the brakes.

6. Brake operating mechanism comprising a support, a worm rotatively mounted with respect to said support, means for effecting rotation of said worm, a movable nut enmeshed with said worm fixed to said support against movement parallel to the travel of the worm, an eccentric mounted in the support and having a pair of cam faces, one cam face being adapted to maintain the nut enmeshed with the worm and the other cam face being adapted to move the nut out of engagement with the worm, a lever for operating said eccentric, a brake staff connected to said worm, and a bell-crank lever connected to the other end of said brake staff and adapted to effect application of the brakes.

7. Brake operating mechanism comprising a cylindrical casing, a worm rotatively mounted within said casing, a nut slidingly mounted within the casing for engagement and disengagement with the worm, means for rotating the worm, means for advancing and retracting said nut, and a connection secured to the worm and adapted to effect application of the brakes.

8. Brake operating mechanism comprising a cylindrical casing, a worm rotatively mounted with said casing, a nut slidingly mounted within the casing for engagement and disengagement with the worm, an eccentric mounted in the casing and having a pair of cam faces, one cam face being adapted to maintain the nut enmeshed with the worm and the other cam face being adapted to move the nut out of engagement with the worm, a lever for operating said eccentric, and a brake staff bearing a swiveled relation to the worm and adapted to effect operation of the brakes.

9. Brake operating mechanism comprising a cylindrical casing, a worm rotatively mounted with said casing, a nut slidingly mounted within the casing for engagement and disengagement with the worm, an eccentric mounted in the casing and having a pair of cam faces, one cam face being adapted to maintain the nut enmeshed with the worm and the other cam face being adapted to move the nut out of engagement with the worm, a lever for operating said eccentric, a brake staff bearing a swiveled relation to the worm at one end, a bell-crank lever secured to the other end of said staff, and a brake rod connected to the opposite end of the bell-crank lever and adapted to effect operation of the brakes.

10. Brake operating mechanism comprising a support and a worm cooperating therewith, said support and worm being so mounted that one member remains stationary and the other member is adapted for rotation and longitudinal movement, threaded means carried by the support and movable into and out of enmeshment with the worm, and means for moving said threaded means into and out of enmeshment with said worm.

In testimony whereof I affix my signature.

HARLEY E. ANDERSON.